(12) United States Patent
Quattrocolo et al.

(10) Patent No.: US 8,919,850 B2
(45) Date of Patent: Dec. 30, 2014

(54) EQUIPPED LIVING COMPARTMENT FOR TRANSPORT VEHICLES

(75) Inventors: Silvia Quattrocolo, Orbassano (IT); Angelo Storgato, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 0 days.

(21) Appl. No.: 13/824,069

(22) PCT Filed: Sep. 19, 2011

(86) PCT No.: PCT/IB2011/054099
§ 371 (c)(1),
(2), (4) Date: Mar. 28, 2013

(87) PCT Pub. No.: WO2012/035523
PCT Pub. Date: Mar. 22, 2012

(65) Prior Publication Data
US 2013/0221696 A1    Aug. 29, 2013

(30) Foreign Application Priority Data
Sep. 17, 2010    (EP) ..................................... 10425304

(51) Int. Cl.
*B60P 3/36*    (2006.01)
*B62D 33/06*    (2006.01)

(52) U.S. Cl.
CPC ............... *B60P 3/36* (2013.01); *B62D 33/0612* (2013.01)
USPC ..................................... 296/24.4; 296/190.02

(58) Field of Classification Search
CPC .............. B60P 3/36; B62D 33/0612
USPC ................. 296/190.02, 24.3, 24.35, 22, 24.4, 296/37.16, 208, 37.5; 5/118
IPC .......................................................... B60P 3/36
See application file for complete search history.

(56) References Cited

U.S. PATENT DOCUMENTS

| 3,102,533 | A |   | 9/1963 | Jenn et al. |
| 3,165,350 | A | * | 1/1965 | Willson ........................ 296/156 |
| 4,903,723 | A |   | 2/1990 | Sublett |
| 5,193,562 | A |   | 3/1993 | Rigby et al. |
| 5,787,719 | A | * | 8/1998 | Wilson ............................ 62/236 |

(Continued)

FOREIGN PATENT DOCUMENTS

| DE | 24 14 993 A1 | 10/1975 |
| DE | 38 43 040 A1 | 6/1990 |

(Continued)

OTHER PUBLICATIONS

"Older Whirlpool / Kenmore Dishwasher Won't Drain", Nov. 14, 2008.

(Continued)

*Primary Examiner* — Pinel Romain
(74) *Attorney, Agent, or Firm* — Dickstein Shapiro LLP

(57) ABSTRACT

An equipped living, compartment for transport vehicles, the equipped compartment being provided with a multipurpose kitchen unit defined by a cabinet having a top closing lid and provided with a cooking surface, which is mounted underneath the lid and can be turned up or down, at least in part, between a lowered operative position and a raised inoperative position, and with a basin or sink set in a fixed position underneath the cooking surface.

11 Claims, 4 Drawing Sheets

(56) References Cited

U.S. PATENT DOCUMENTS

| | | | |
|---|---|---|---|
| 6,431,628 B1 * | 8/2002 | Bell, Jr. | 296/24.32 |
| 7,040,329 B2 * | 5/2006 | DeBoer et al. | 134/115 R |
| 2006/0226669 A1 | 10/2006 | Tong et al. | |
| 2010/0089378 A1 * | 4/2010 | Babington et al. | 126/21 R |

FOREIGN PATENT DOCUMENTS

| | | |
|---|---|---|
| DE | 20 2004 002 573 U1 | 6/2004 |
| EP | 0 008 978 A1 | 3/1980 |
| FR | 2 730 040 A1 | 8/1996 |
| GB | 1 229 839 A | 4/1971 |
| JP | 5-148871 A | 6/1993 |
| WO | WO 2004/090425 A2 | 10/2004 |
| WO | WO 2012/032460 A1 | 3/2012 |

OTHER PUBLICATIONS

Hoak et al., "How Energy Efficient are Modern Dishwashers?", Proceedings of ACEEE 2008 Summer Study on Energy Efficiency in Building, Aug. 2008.

* cited by examiner

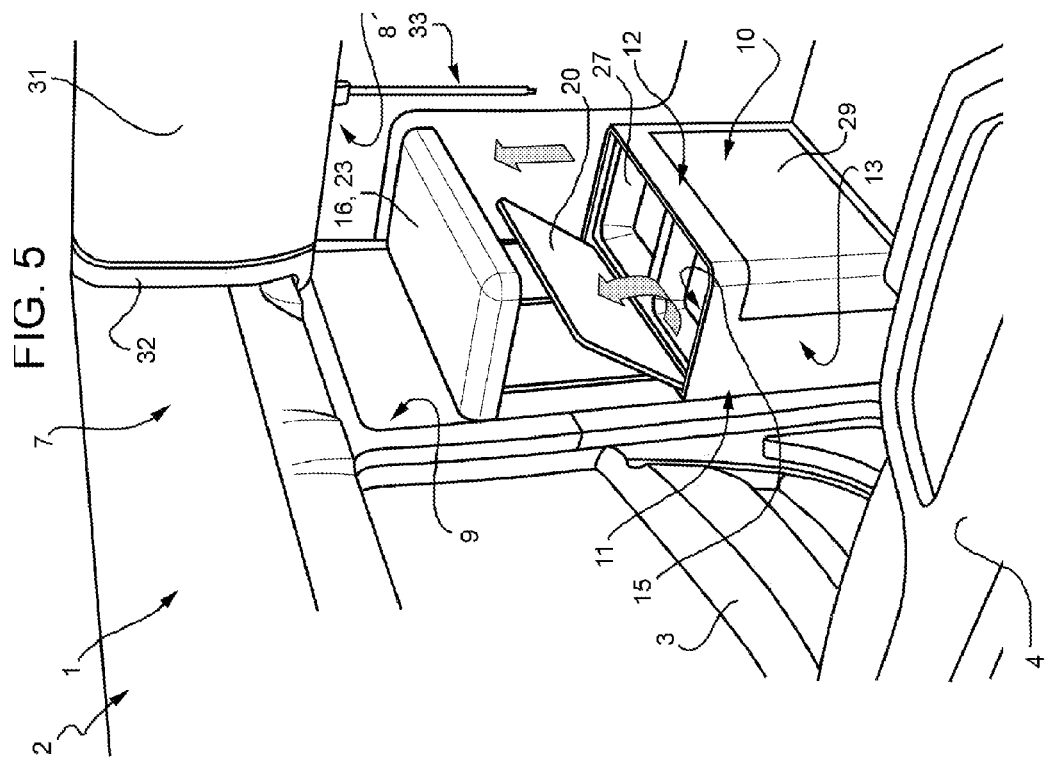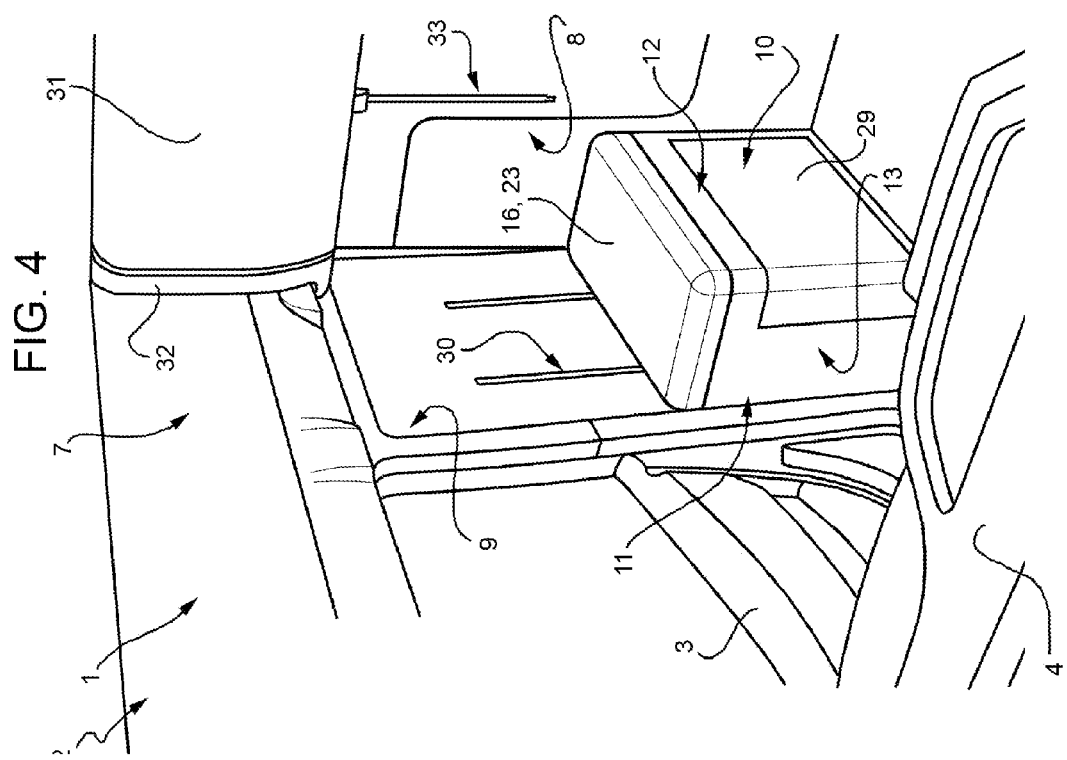

EQUIPPED LIVING COMPARTMENT FOR TRANSPORT VEHICLES

TECHNICAL FIELD OF THE INVENTION

The present invention relates to an equipped living compartment for transport vehicles.

In particular, the present invention finds advantageous application on all those transport vehicles that are normally used for relatively long trips, during which there is felt the need to equip, within the vehicle itself, a space for refreshment and rest of the driver and/or of the passengers. Vehicles of this type are, for example, road vehicles for transportation of goods, campers, watercraft, aircraft, etc.

In particular, the ensuing treatment will make explicit reference, without this implying any loss of generality, to the use of the equipped compartment of the present invention in the construction of a rear portion of the cab of a lorry.

DESCRIPTION OF THE INVENTION

Aim of the present invention is to provide an equipped living compartment for transport vehicles, in particular lorries, said compartment being furnished with all the equipment normally necessary for rest and refreshment of the driver and/or passengers and, at the same time, is as compact, functional, and readily exploitable as possible.

According to the present invention an equipped living compartment for transport vehicles is provided, as claimed in the appended Claims.

BRIEF DESCRIPTION OF THE DRAWINGS

The invention will now be described with reference to the annexed drawings, which illustrate some non-limiting examples of embodiment thereof and in which:

FIGS. 4 and 5 illustrate, in respective different operative configurations and with parts removed for reasons of clarity, a further embodiment of the compartment of the present invention.

PREFERRED EMBODIMENTS OF THE INVENTION

Figure 1:
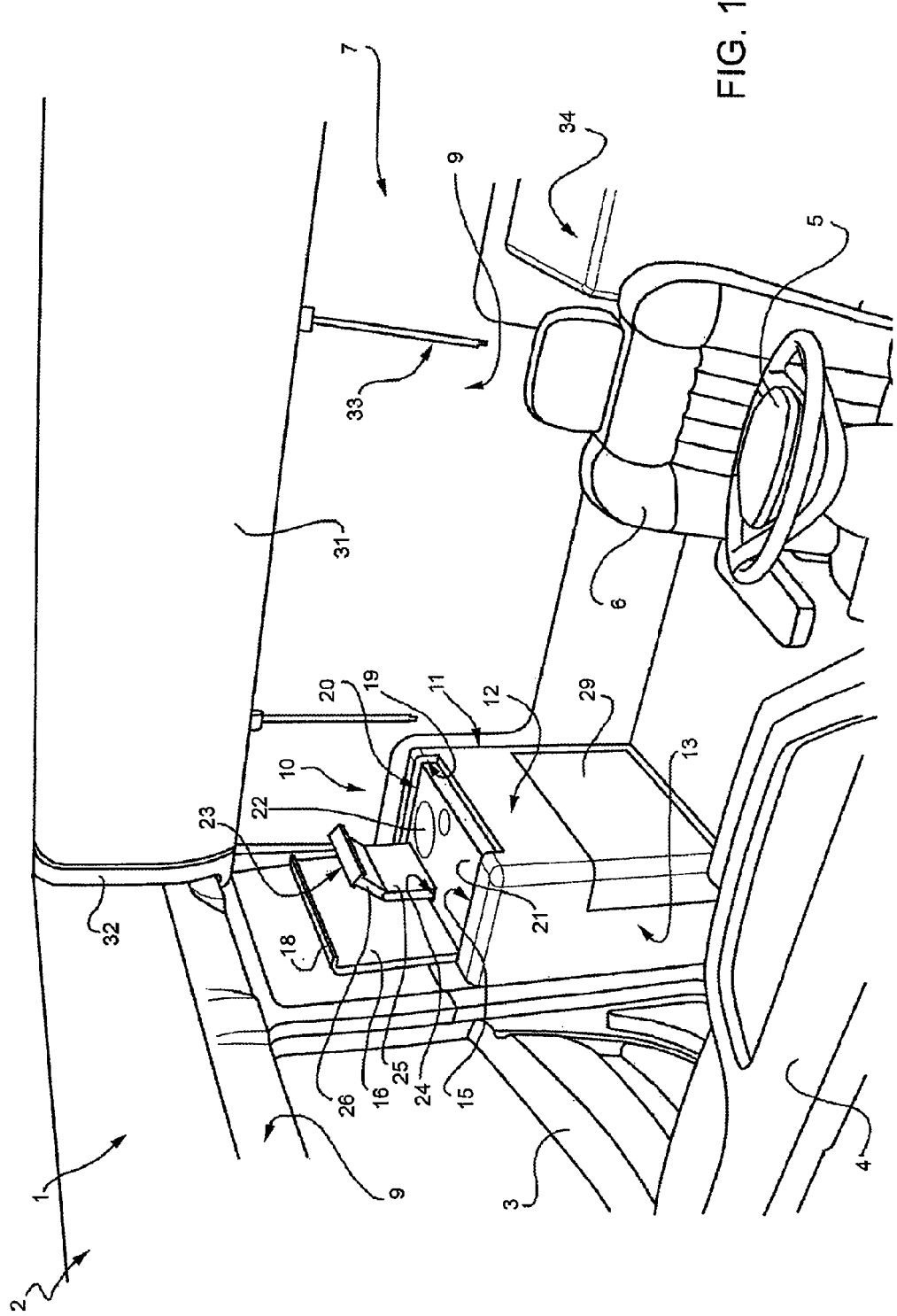
FIGS. 1 and 2 illustrate, in respective different operative configurations, a preferred embodiment of the compartment of the present invention integrated in the cab of a lorry.
Figure 2:
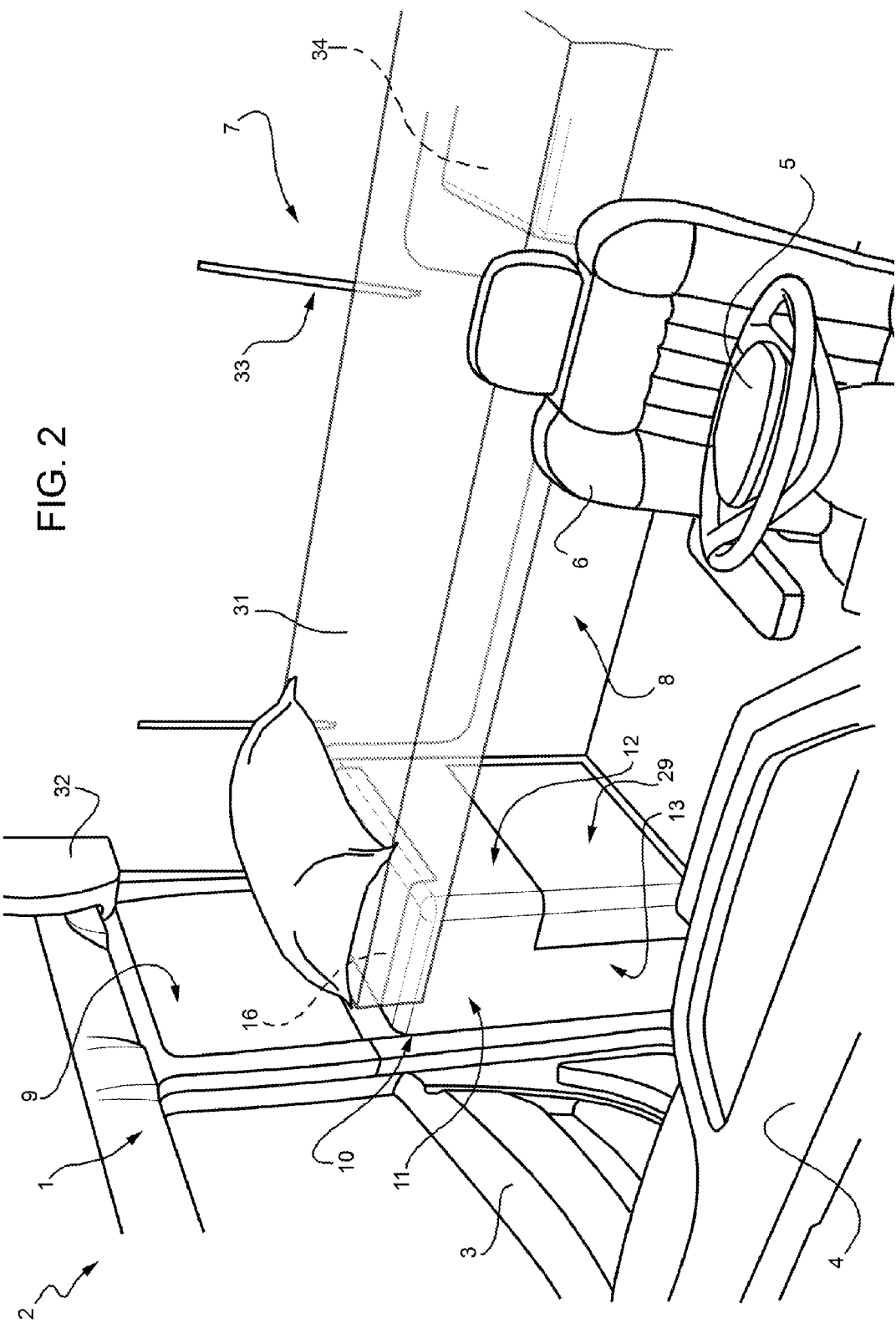

Designated as a whole by 1 in FIGS. 1 and 2 is the cab of a vehicle 2, in the case in point a lorry. The cab 1 communicates with the outside world through two doors 3 (only one of which is illustrated) and can be divided into a front part, which is for driving and comprises a dashboard 4, a steering wheel 5, and a seat 6 for the driver, and a rear part, which is for activities of amusement or refreshment for the driver and/or a passenger and is defined by an equipped compartment 7, which is limited by a rear wall 8 and by two side walls 9 of the cab 1 and is preferably isolated from the front part of the cab 1 itself via a mobile partition wall or a curtain (not illustrated).

The compartment 7 comprises a multipurpose kitchen unit 10, designed to enable the conservation and cooking of food and washing of food and dishes.

Figure 3:
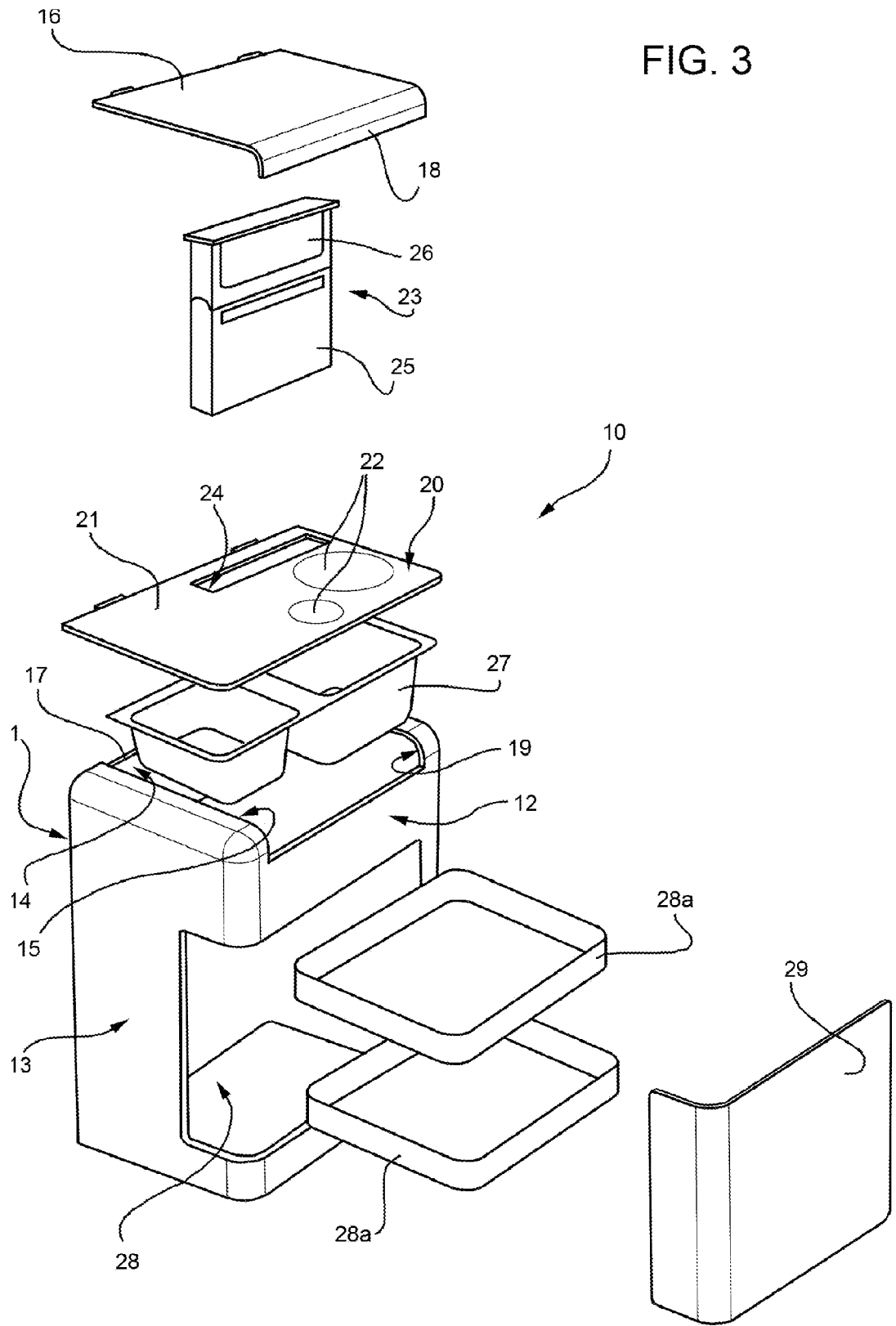
FIG. 3 is an exploded view of a detail of the equipped compartment of FIGS. 1 and 2.

In particular, according to what is illustrated in FIG. 1 and, in greater detail, in FIG. 3, the multipurpose kitchen unit 10 comprises a generally parallelepipedal cabinet 11, having a front panel 12, two mutually parallel side walls 13 transverse to the front panel 12, and a rear panel 14 parallel to the front panel 12 and set up against one of the side walls 9 of the cab 1 in a position set between a corresponding door 3 and the rear wall 8. The cabinet 11 has, at its top, an opening 15 provided with a lid 16 mounted so that it can turn about a hinge axis extending along an edge 17 of the opening 15 set in the proximity of the rear wall 14 to turn between a lowered horizontal position (FIG. 2) for closing of the opening 15 itself and a raised vertical position (FIG. 1), in which the lid 16 is resting against, and is substantially parallel to, the side wall 3 of the cab 1. In the example illustrated, the edge 17 coincides with a top free edge of the rear panel 14, but, according to other embodiments (not illustrated), the edge 17 can be set internally or be transverse to the top edge of the rear panel 14.

The lid 16 is defined by a plane plate, preferably made of acrylic resin or the like, which engages the opening 15 and is provided, on the side opposite to the hinged side, with an edge 18 bent to form a bracket and inserted, when the lid 16 is set in the aforesaid lowered position, in a slot 19 made on a top free edge of the front panel 12 in such a way as to facilitate, in use, gripping and lifting of the lid 16 by a user.

The multipurpose kitchen unit 10 further comprises a cooking surface 20, which in turn comprises a plate 21 and heating devices 22 carried by the plate 21 itself; preferably, the plate 21 is a plate made of pyroceram, and the heating devices 22 are of an electrical or induction type.

The plate 21 is mounted on the cabinet 11 immediately underneath the lid 16 and is such that it can turn about a hinge axis parallel, and close, to the hinge axis of the lid 16 itself to turn, in use, between a lowered horizontal position, which can be either an operative position, if the lid 16 is in its raised position (FIG. 1), or a resting position, if the lid 16 is in its lowered position and covers completely the cooking surface 20, and a raised position (not illustrated), which can be assumed only if the lid 16 is in turn in the raised position, and wherein the cooking surface 20 is substantially vertical and resting on the lid 16.

To enable suction of the fumes produced during cooking of the food, the cooking surface 20 is provided with a suction hood 23, which is slidably mounted through a slot 24 made in the plate 21 in the proximity of the rear panel 14 to enable displacement thereof, manually or via an automatic pneumatically or electrically operated lifting system, in a roughly vertical direction between a flush-mounted resting position, in which the suction hood 23 is completely inserted in a seat (as can be understood in FIG. 2, showing the lid 16 closed over the retracted suction hood 23) set underneath the cooking surface 20 by pivoting the upper portion in the direction shown by arrow A and then retracting the suction hood 23 in the direction shown by arrow B via the slot 24, and an extracted position (FIG. 1), in which the suction hood 23 engages the slot 24 transversely and extends above the cooking surface 20.

According to what is illustrated in FIGS. 1 and 3, the suction hood 23 is set over the cooking surface 20 in the area of the plate 21 occupied by the heating devices 22 and comprises a parallelepipedal body divided transversely, with interposition of a rotation hinge (not illustrated), in a bottom portion 25, which defines the suction element, and a top portion 26, which carries a lighting device.

In its raised position, the cooking surface 20 renders possible access to a basin or sink 27, which is rigidly mounted within the cabinet 11 and is provided with a tap (not illustrated) and hydraulic connections for connection of the sink 27 itself to a tank (not illustrated) for supply of water and to a discharge tank or pipe (not illustrated).

In the example illustrated in the attached figures, the cooking surface 20 covers the sink 27 completely when it is set in its lowered position; according to a different embodiment (not illustrated), the plate 21 of the cooking surface 20 is divided, in a direction transverse to the hinge axis, into two or more mutually contiguous parts that can be turned up independently of one another in such a way as to enable a user to gain access to the sink 27 and, at the same time, use at least part of the cooking surface 20.

The multipurpose kitchen unit 10 finally comprises a refrigerating cell 28, which is flush-mounted in a bottom portion of the cabinet 11 underneath the sink 27, comprises a plurality of extractable shelves 28a and is closed by a door 29, which defines part of the front panel 12 of the cabinet 11 and can be either a rigid panel hinged on one side or may be slid open, or else an articulated panel with a rolling/unrolling opening/closing system.

The multipurpose kitchen unit 10 illustrated in FIGS. 4 and 5 differs from the multipurpose kitchen unit 10 of the example described above in that the lid 16 is not mounted on the cabinet 11 so that it can be turned up, but is mounted slidably, in a vertical direction parallel to itself, along a guide 30 mounted on the side wall 3 of the cab 1 so that it can be displaced, manually or via an automatic system of a pneumatic or electrical type, between a lowered horizontal position (FIG. 4) and a raised horizontal position (FIG. 5). Furthermore, in this embodiment, the suction hood 23 is integrated within the lid 16, which, consequently, has a thickness greater than that of the lid 16 of the previous example. In this case, moreover, the lid 16 is without the edge 18.

According to what is illustrated in FIGS. 1, 2, 4 and 5, the compartment 7 further comprises a bed or bunk 31 that can be pulled down and slide vertically, which is supported by the rear wall 8 of the cab 1, extends approximately from one side wall 9 to the other, and is mounted both so that it can turn between a closed position (FIGS. 1, 4 and 5), in which the bunk 31 is parallel to, and in contact with, the rear wall 8 and is contained between two fixed shoulders 32 (only one of which is illustrated) set over the multipurpose kitchen unit 10, and a raised open position (not illustrated), and so that it can slide, parallel to itself and along a vertical guide 33 carried by the rear wall 8, from the aforesaid raised open position to a lowered open position (FIG. 2), in which one end portion of the bunk 31 is set resting on the closed lid 16 of the multipurpose kitchen unit 10 and the opposite end portion is set resting on the top of a cupboard 34, which is set facing the cabinet 11, has the same height as the cabinet 11, and is designed to be used as larder or for storing crockery, dishes, bedclothes, etc.

In practice, hence, the multipurpose kitchen unit 10 is designed to define, when the lid 16 is in the lowered position, a rest for the bunk 31 set in the open lowered position.

According to a different embodiment (not illustrated), the cupboard 34 is absent and is replaced by a removable space-saving resting base, for example a foldable element carried by the bunk 31 or by the rear wall 8 or side wall 3.

The invention claimed is:

1. An equipped living compartment for transport vehicles, the equipped compartment comprising a multipurpose kitchen unit in turn comprising a cabinet, a lid for closing a top of the cabinet, a cooking surface, which is mounted on the cabinet underneath the lid and which can be turned up or down, at least in part, between a lowered operative position and a raised inoperative position, and a sink set in a fixed position underneath the cooking surface, wherein the cooking surface has substantially the same size as the lid and is mounted to cover the sink when the cooking surface is the lowered operative position, and to uncover the sink when the cooking surface is in the raised inoperative position; and wherein the lid is mounted to move from a lowered position, where it covers the cooking surface, and a raised position, where it uncovers the cooking surface.

2. The equipped compartment according to claim 1, further comprising a refrigerating cell set within the cabinet underneath the sink.

3. The equipped compartment according to claim 1, wherein the lid is mounted to turn about an axis between a lowered horizontal position and a raised substantially vertical position.

4. The equipped compartment according to claim 3, and further comprising a suction hood mounted through the cooking surface for sliding, with respect to the cooking surface itself and when the lid is in the raised position, between a lowered position underneath the cooking surface and an extracted position, in which the suction hood is set over the cooking surface itself.

5. The equipped compartment according to claim 1, wherein the lid is mounted for translating in a vertical direction between a lowered horizontal position and a raised horizontal position.

6. The compartment according to claim 5, and further comprising a suction hood integrated in the lid.

7. The equipped compartment according to claim 1, and further comprising a bunk, which is mobile between a closed position and an open position; the lid defining a resting surface for the bunk in the open position.

8. The equipped compartment according to claim 1, wherein the equipped compartment is located within a transport vehicle.

9. The equipped compartment according to claim 8, wherein the transport vehicle comprises a driving cab, and wherein the equipped compartment is provided within a rear portion of the driving cab.

10. The equipped compartment according to claim 1, wherein the cooking surface has substantially the same size as the lid and is mounted to cover the sink when the cooking surface is the lowered operative position, and to uncover the sink, when the cooking surface is in the raised inoperative position.

11. The equipped compartment according to claim 1, wherein the lid is mounted to move from a lowered position, where it covers the cooking surface, and a raised position, where it uncovers the cooking surface.

* * * * *